(12) United States Patent
Cordes et al.

(10) Patent No.: US 10,223,266 B2
(45) Date of Patent: Mar. 5, 2019

(54) EXTENDED STORE FORWARDING FOR STORE MISSES WITHOUT CACHE ALLOCATE

(71) Applicant: International Business Machines Corporation, Armonk, NY (US)

(72) Inventors: Robert A. Cordes, Austin, TX (US); Hung Q. Le, Austin, TX (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 15/364,411

(22) Filed: Nov. 30, 2016

(65) Prior Publication Data
US 2018/0150395 A1 May 31, 2018

(51) Int. Cl.
*G06F 12/00* (2006.01)
*G06F 12/0815* (2016.01)
*G06F 12/0811* (2016.01)
*G06F 12/0804* (2016.01)
*G06F 12/0875* (2016.01)

(52) U.S. Cl.
CPC ...... *G06F 12/0815* (2013.01); *G06F 12/0804* (2013.01); *G06F 12/0811* (2013.01); *G06F 12/0875* (2013.01); *G06F 2212/452* (2013.01); *G06F 2212/60* (2013.01); *G06F 2212/621* (2013.01)

(58) Field of Classification Search
CPC ............. G06F 12/0815; G06F 12/0804; G06F 12/0811; G06F 12/0875; G06F 2212/452; G06F 2212/60; G06F 2212/621
See application file for complete search history.

(56) References Cited

U.S. PATENT DOCUMENTS 6,070,233 A * 5/2000 Whittaker ........... G06F 12/0811
 711/141
6,463,514 B1 * 10/2002 Ray ..................... G06F 12/0851
 711/168
(Continued)

FOREIGN PATENT DOCUMENTS

WO 2012138957 A1 10/2012

OTHER PUBLICATIONS

Sinharoy et al., "IBM POWER8 Processor Core Microarchitecture". IBM Journal of Research and Development 59.1 (2015): 2-1.
(Continued)

*Primary Examiner* — Prasith Thammavong
(74) *Attorney, Agent, or Firm* — Law Office of Jim Boice (57) ABSTRACT

A load store unit (LSU) in a processor core detects that new data produced by the processor core is ready to be drained to an L2 cache. In response to the LSU detecting that an earlier version of the new data is not stored in L1 cache, a memory controller sends the new data as L1 cache missed data to a store queue (STQ), where the STQ makes data available for deallocation from the STQ to the L2 cache. In response to determining that there is no newer data waiting to be stored in the STQ, or no cache line invalidate to the line containing the store data in the STQ that misses the cache, the memory controller maintains the new data in the STQ with a zombie stat bit that indicates that the new data is a zombie store entry that can be utilized by the processor core.

20 Claims, 4 Drawing Sheets

(56) References Cited

U.S. PATENT DOCUMENTS

| | | | |
|---|---|---|---|
| 6,633,565 B1 * | 10/2003 | Bronstein | H04L 49/3009 370/392 |
| 8,103,856 B2 | 1/2012 | Balasubramonian et al. | |
| 2014/0149632 A1 * | 5/2014 | Kannan | G06F 12/0862 711/3 |
| 2014/0189316 A1 | 7/2014 | Govindu et al. | |
| 2014/0304474 A1 * | 10/2014 | Reinhardt | G06F 12/0811 711/123 |

OTHER PUBLICATIONS

Kora et al., "MLP-Aware Dynamic Instruction Window Resizing in Superscalar Processors for Adaptively Exploiting Available Parallelism". IEICE Transactions on Information and Systems 97.12 (2014): 3110-3123.

Gunadi et al., "A Position-Insensitive Finished Store Buffer". Computer Design, 2007. ICCD 2007. 25th International Conference On. IEEE, 2007.

Ubal, "Out-of-Order Retirement of Instructions in Superscalar, Multithread, and Multicore Processors". Diss. 2010.

Gleim, "Affordable Kilo-Instruction Processors". Diss, Universitat Polit'ecnica de Catalunya, 2008.

* cited by examiner

EXTENDED STORE FORWARDING FOR STORE MISSES WITHOUT CACHE ALLOCATE

BACKGROUND

The present disclosure relates to the field of processors, and more specifically to the field of processor cores. Still more specifically, the present disclosure relates to the use of caches within a processor core.

SUMMARY

In an embodiment of the present invention, a method, and/or computer program product extends store forwarding for cache misses. A load store unit (LSU) in a processor core detects that new data produced by the processor core is ready to be drained to an L2 cache in the processor core. The LSU checks whether an earlier version of the new data is stored in an L1 cache in the processor core. In response to the LSU detecting that the earlier version of the new data is not stored in the L1 cache, a memory controller sends the new data as L1 cache missed data to a store queue (STQ), where the STQ makes data available for deallocation from the STQ to the L2 cache. The memory controller determines whether a newer data produced by the processor core is waiting to be stored in the STQ. In response to determining that there is no newer data waiting to be stored in the STQ, the memory controller maintains the new data in the STQ with a zombie stat bit, where the zombie stat bit indicates that the new data is a zombie store entry that can be utilized by the processor core. Additionally the memory controller determines whether the cache line that contains the zombie data in the STQ is invalidated by the system. In response to determining that there is no cache line invalidating to the zombie store in the STQ, the memory controller maintains the new data in the STQ with a zombie stat bit, where the zombie stat bit indicates that the new data is a zombie store entry that can be utilized by the processor core.

In an embodiment of the present invention a processor core includes one or more hardware execution units, a load store unit (LSU), an L1 cache, an L2 cache, a memory controller; and a store queue (STQ). The LSU detects that new data produced by the processor core is ready to be drained to the L2 cache in the processor core, and checks whether an earlier version of the new data is stored in the L1 cache. The memory controller, in response to the LSU detecting that the earlier version of the new data is not stored in the L1 cache, sends the new data as L1 cache missed data to the store queue (STQ), where the STQ makes data available for deallocation from the STQ to the L2 cache. The memory controller determines whether a newer data produced by the processor core is waiting to be stored in the STQ. In response to determining that there is no newer data waiting to be stored in the STQ, the memory controller maintains the new data in the STQ with a zombie stat bit, where the zombie stat bit indicates that the new data is a zombie store entry that can be utilized by the processor core.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
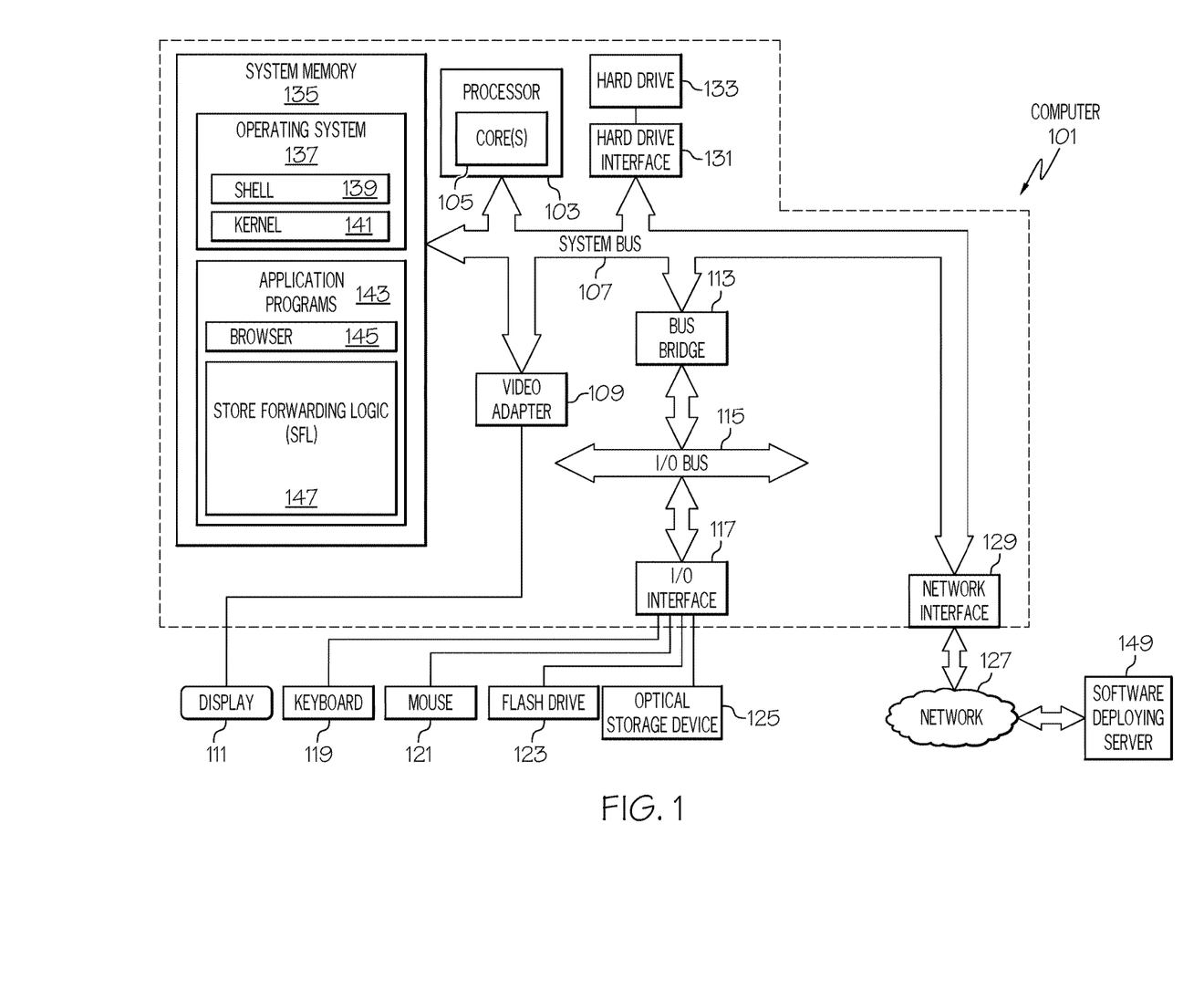
FIG. 1 depicts an exemplary computer system and/or network which may be utilized by the present invention.

With reference now to the figures, and particularly to FIG. 1, there is depicted a block diagram of an exemplary computer 101, within which the present invention may be utilized. Note that some or all of the exemplary architecture shown for computer 101 may be utilized by software deploying server 149 shown in FIG. 1.

Computer 101 includes a processor 103, which may utilize one or more processors each having one or more processor cores 105. Processor 103 is coupled to a system bus 107. A video adapter 109, which drives/supports a display 111, is also coupled to system bus 107. System bus 107 is coupled via a bus bridge 113 to an Input/Output (I/O) bus 115. An I/O interface 117 is coupled to I/O bus 115. I/O interface 117 affords communication with various I/O devices, including a keyboard 119, a mouse 121, a Flash Drive 123, and an optical storage device 125 (e.g., a CD or DVD drive). The format of the ports connected to I/O interface 117 may be any known to those skilled in the art of computer architecture, including but not limited to Universal Serial Bus (USB) ports.

Computer 101 is able to communicate with a software deploying server 149 and other devices via network 127 using a network interface 129, which is coupled to system bus 107. Network 127 may be an external network such as the Internet, or an internal network such as an Ethernet or a Virtual Private Network (VPN). Network 127 may be a wired or wireless network, including but not limited to cellular networks, Wi-Fi networks, hardwired networks, etc.

A hard drive interface 131 is also coupled to system bus 107. Hard drive interface 131 interfaces with a hard drive 133. In a preferred embodiment, hard drive 133 populates a system memory 135, which is also coupled to system bus 107. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a World Wide Web (WWW) client (i.e., computer 101) to send and receive network messages to the Internet using HyperText Transfer Protocol (HTTP) messaging, thus enabling communication with software deploying server 149 and other described computer systems.

Application programs 143 in computer 101's system memory (as well as software deploying server 149's system memory) also include a Store Forwarding Logic (SFL) 147. SFL 147 includes code for implementing the processes described below in FIGS. 3-4. In one embodiment, computer 101 is able to download SFL 147 from software deploying server 149, including in an on-demand basis.

The hardware elements depicted in computer 101 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
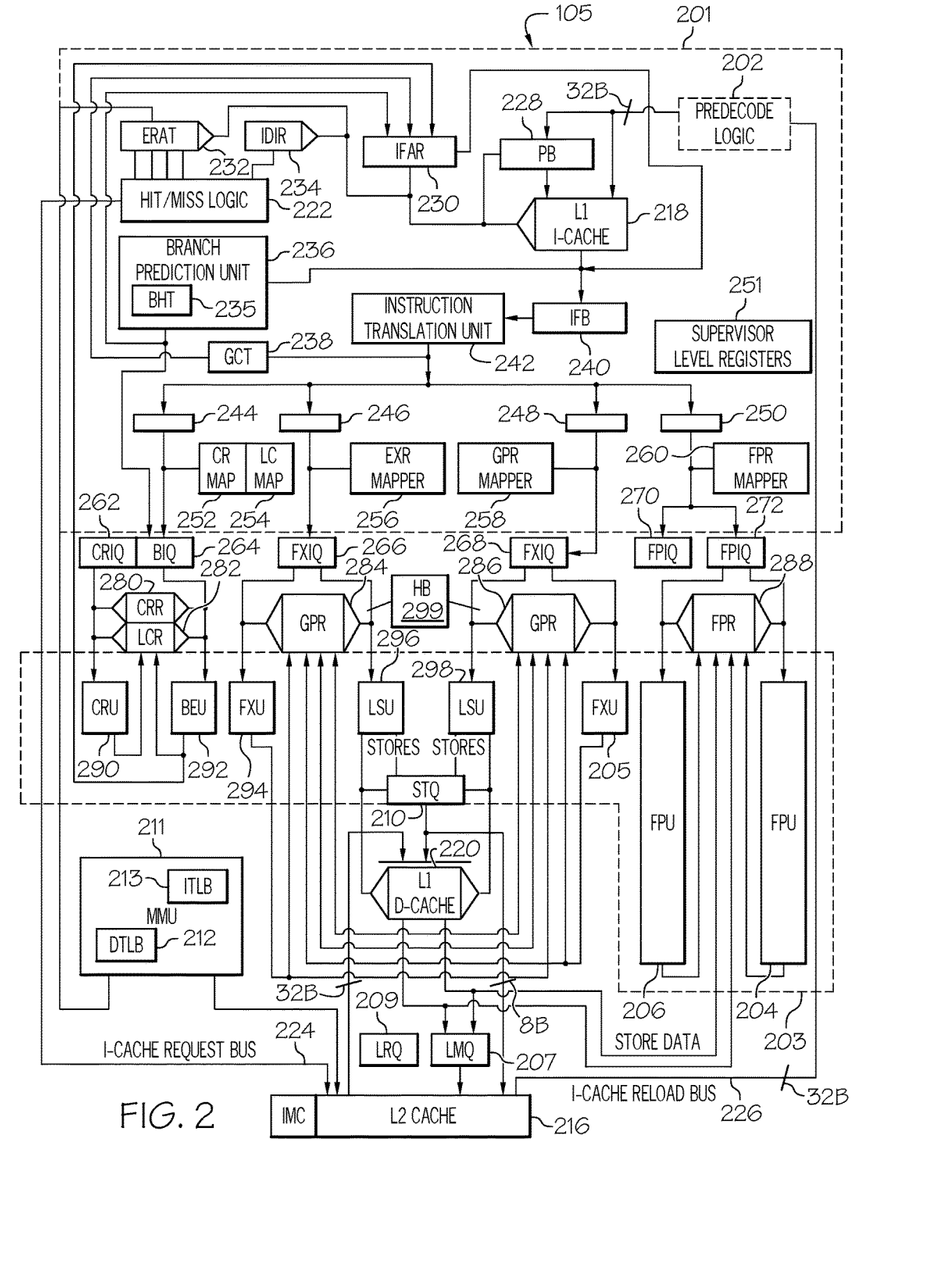
FIG. 2 illustrates additional exemplary detail of a processor core depicted in FIG. 1.

With reference now to FIG. 2, additional exemplary detail of core 105 depicted in FIG. 1 is presented. Core 105 includes an on-chip multi-level cache hierarchy including a unified level two (L2) cache 216 and bifurcated level one (L1) instruction (I) and data (D) caches 218 and 220, respectively. As is well-known to those skilled in the art, caches 216, 218 and 220 provide low latency access to cache lines corresponding to memory locations in system memories (e.g., system memory 135 shown in FIG. 1).

Instructions are fetched for processing from L1 I-cache 218 in response to the effective address (EA) residing in instruction fetch address register (IFAR) 230. During each cycle, a new instruction fetch address may be loaded into IFAR 230 from one of three sources: branch prediction unit (BPU) 236, which provides speculative target path and sequential addresses resulting from the prediction of conditional branch instructions, global completion table (GCT) 238, which provides flush and interrupt addresses, and branch execution unit (BEU) 292, which provides non-speculative addresses resulting from the resolution of predicted conditional branch instructions. Associated with BPU 236 is a branch history table (BHT) 235, in which are recorded the resolutions of conditional branch instructions to aid in the prediction of future branch instructions.

An effective address (EA), such as the instruction fetch address within IFAR 230, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within core 105, effective-to-real address translation is performed by memory management units (MMUs) and associated address translation facilities. Preferably, a separate MMU is provided for instruction accesses and data accesses. In FIG. 2, a single MMU 211 is illustrated, for purposes of clarity, showing connections only to Instruction Store Unit (ISU) 201. However, it is understood by those skilled in the art that MMU 211 also preferably includes connections (not shown) to load/store units (LSUs) 296 and 298 and other components necessary for managing memory accesses. MMU 211 includes Data Translation Lookaside Buffer (DTLB) 212 and Instruction Translation Lookaside Buffer (ITLB) 213. Each TLB contains recently referenced page table entries, which are accessed to translate EAs to RAs for data (DTLB 212) or instructions (ITLB 213). Recently referenced EA-to-RA translations from ITLB 213 are cached in EOP effective-to-real address table (ERAT) 232.

If hit/miss logic 222 determines, after translation of the EA contained in IFAR 230 by ERAT 232 and lookup of the real address (RA) in I-cache directory 234, that the cache line of instructions corresponding to the EA in IFAR 230 does not reside in L1 I-cache 218, then hit/miss logic 222 provides the RA to L2 cache 216 as a request address via I-cache request bus 224. Such request addresses may also be generated by prefetch logic within L2 cache 216 based upon recent access patterns. In response to a request address, L2 cache 216 outputs a cache line of instructions, which are loaded into prefetch buffer (PB) 228 and L1 I-cache 218 via I-cache reload bus 226, possibly after passing through optional predecode logic 202.

Once the cache line specified by the EA in IFAR 230 resides in L1 I-cache 218, L1 I-cache 218 outputs the cache line to both branch prediction unit (BPU) 236 and to instruction fetch buffer (IFB) 240. BPU 236 scans the cache line of instructions for branch instructions and predicts the outcome of conditional branch instructions, if any. Following a branch prediction, BPU 236 furnishes a speculative instruction fetch address to IFAR 230, as discussed above, and passes the prediction to branch instruction queue (BIQ) 264 so that the accuracy of the prediction can be determined when the conditional branch instruction is subsequently resolved by branch execution unit 292.

IFB 240 temporarily buffers the cache line of instructions received from L1 I-cache 218 until the cache line of instructions can be translated by instruction translation unit (ITU) 242. In the illustrated embodiment of core 105, ITU 242 translates instructions from user instruction set architecture (UISA) instructions into a possibly different number of internal ISA (IISA) instructions that are directly executable by the execution units of core 105. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 238 to an instruction group, the members of which are permitted to be dispatched and executed out-of-order with respect to one another. Global completion table 238 tracks each instruction group for which execution has yet to be completed by at least one associated EA, which is preferably the EA of the oldest instruction in the instruction group.

Following UISA-to-IISA instruction translation, instructions are dispatched to one of latches 244, 246, 248 and 250, possibly out-of-order, based upon instruction type. That is, branch instructions and other condition register (CR) modifying instructions are dispatched to latch 244, fixed-point and load-store instructions are dispatched to either of latches 246 and 248, and floating-point instructions are dispatched to latch 250. Each instruction requiring a rename register for temporarily storing execution results is then assigned one or more rename registers by the appropriate one of CR mapper 252, link and count (LC) register mapper 254, exception register (XER) mapper 256, general-purpose register (GPR) mapper 258, and floating-point register (FPR) mapper 260.

The dispatched instructions are then temporarily placed in an appropriate one of CR issue queue (CRIQ) 262, branch issue queue (BIQ) 264, fixed-point issue queues (FXIQs) 266 and 268, and floating-point issue queues (FPIQs) 270 and 272. From issue queues 262, 264, 266, 268, 270 and 272, instructions can be issued opportunistically to the execution units of processor 103 (shown in FIG. 1) for execution as long as data dependencies and antidependencies are observed. The instructions, however, are maintained in issue queues 262-272 until execution of the instructions is complete and the result data, if any, are written back, in case any of the instructions need to be reissued.

As illustrated, the execution units of core 105 include an execution subcomponent 203, which includes a CR unit (CRU) 290 for executing CR-modifying instructions, a branch execution unit (BEU) 292 for executing branch instructions, two fixed-point units (FXUs) 294 and 205 for executing fixed-point instructions, two load-store units (LSUs) 296 and 298 for executing load and store instructions, and two floating-point units (FPUs) 206 and 204 for executing floating-point instructions. Each of execution units 290-294 and 204-206 is preferably implemented as an execution pipeline having a number of pipeline stages.

During execution within one of execution units 290-294 and 204-206, an instruction receives operands, if any, from one or more architected and/or rename registers within a register file coupled to the execution unit. When executing CR-modifying or CR-dependent instructions, CRU 290 and BEU 292 access the CR register file 280, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 282 contains a count register (CTR), a link register (LR) and rename registers of each, by which BEU 292 may also resolve conditional branches to obtain a path address. General-purpose register files (GPRs) 284 and 286, which are synchronized, duplicate register files, and store fixed-point and integer values accessed and produced by FXUs 294 and 205 and LSUs 296 and 298. Note that floating-point register file (FPR) 288, which like GPRs 284 and 286 may also be implemented as duplicate sets of synchronized registers, contains floating-point values that result from the execution of floating-point instructions by FPUs 206 and 204 and floating-point load instructions by LSUs 296 and 298.

Coupled to GPR 284 and/or GPR 286 is a history buffer (HB) 299, which contains historical data that was once held by GPR 284 and/or GPR 286. That is, GPR 284 and/or GPR 286 hold current (newer data), while HB 299 contains older data that used to be, but no long is, stored within GPR 284 and/or GPR 286.

After an execution unit finishes execution of an instruction, the execution unit notifies GCT 238, which schedules completion of instructions in program order. To complete an instruction executed by one of CRU 290, FXUs 294 and 205 or FPUs 206 and 204, GCT 238 signals the execution unit, which writes back the result data, if any, from the assigned rename register(s) to one or more architected registers within the appropriate register file. The instruction is then removed from the issue queue and once all instructions within its instruction group have been completed, it is removed from GCT 238. Other types of instructions, however, are completed differently.

When BEU 292 resolves a conditional branch instruction and determines the path address of the execution path that should be taken, the path address is compared against the speculative path address predicted by BPU 236. If the path addresses match, no further processing is required. If, however, the calculated path address does not match the predicted path address, BEU 292 supplies the correct path address to IFAR 230. In either event, the branch instruction can then be removed from BIQ 264, and when all other instructions within the same instruction group have completed executing, from GCT 238.

Following execution of a load instruction, the effective address computed by executing the load instruction is translated to a real address by a data ERAT (not illustrated) and then provided to L1 D-cache 220 as a request address. At this point, the load instruction is removed from FXIQ 266 or 268 and placed in load reorder queue (LRQ) 209 until the indicated load is performed. If the request address misses in L1 D-cache 220, the request address is placed in load miss queue (LMQ) 207, from which the requested data is retrieved from L2 cache 216, and failing that, from another core 105 or from system memory. LRQ 209 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 210 into which effective addresses for stores are loaded following execution of the store instructions. From STQ 210, data can be loaded into either or both of L1 D-cache 220 and L2 cache 216.

Note that the state of a processor includes stored data, instructions and hardware states at a particular time, and are herein defined as either being "hard" or "soft." The "hard" state is defined as the information within a processor that is architecturally required for a processor to execute a process from its present point in the process. The "soft" state, by contrast, is defined as information within a processor that would improve efficiency of execution of a process, but is not required to achieve an architecturally correct result. In core 105 of FIG. 2, the hard state includes the contents of user-level registers, such as CRR 280, LCR 282, GPRs 284 and 286, FPR 288, as well as supervisor level registers 251. The soft state of core 105 includes both "performance-critical" information, such as the contents of L1 I-cache 218, L1 D-cache 220, address translation information such as DTLB 212 and ITLB 213, and less critical information, such as BHT 235 and all or part of the content of L2 cache 216. Thus, the content of such registers are fixed values that describe a real-time current architecture state register of the processor core 105.

Note that as used to describe core 105 in FIG. 2, L1 denotes lowest level of cache, which is first checked to locate an operator (in the case of an instruction (I) cache) or an operand (in the case of a data (D) cache). If the requisite operand/data is not found within the L1 cache (i.e., a "cache miss"), then the next highest level cache memory (L2 cache) is searched. If there is an L2 cache miss, then the next highest L3 cache (if the system has an L3 level cache) is searched. If there is an L2/L3 cache miss, then system memory is searched for the requisite operand/data. If system memory does not have the needed operand/data (e.g., a page fault), then virtual memory, persistent memory (e.g., a hard drive), and/or a memory cloud (e.g., a network of storage devices) are searched for the needed operand or data.

In one embodiment, if an unauthorized attempt is made to access processor 103 shown in FIG. 1, a core dump from the processor 103 will occur, thus preventing the nefarious attacker from accessing the hard/soft states of processor 103. A core dump includes a recorded state of memory being used by an application at the time of the attack. The core dump includes contents of a program counter, stack pointer, OS flags, etc. In one embodiment, the core dump specifically includes contents of the L1 instruction cache 218, the L1 data cache 220, the L2 cache 216, the CRR 280, LCR 282, GPR 284, and/or FPR 288 depicted and described in FIG. 2. Thus, the content of the core dump contains the "hard" state and/or the "soft" state of the core, as described/defined above.

A common cache design policy for level 1 (L1) cache in a processor subsystem (e.g., a processor core) is a store-through cache with no write allocate. Under a store-through cache policy, store-through cache users store changed or unchanged data in the cache structure. However, unlike a store-in cache policy, the store-through user writes changed data to the cache structure (e.g., L1 cache, L2 cache, L3 cache) and to permanent storage (e.g., system memory) at the same time and under the same serialization. Thus, the data in the cache structure matches the data in permanent storage at any time.

At times, a cache line write to cache will fail if the address for that cache line is not found in the cache. There are two approaches for handling such write misses. The first is known as a write allocate, in which the cache line is reserved in the cache, followed by a write to the cache. The second is known as a no-write allocate, in which the data at the missed-write location is not loaded to cache, but rather is just written directly to the backing store. That is, under a write allocate policy, the data is fetched from memory into the cache before being written, such that the data is read, written to cache, and then stored in (system) memory. Under the no-write allocate policy, the data is directly modified in the lower level without being written to the cache first (i.e., is just stored to memory).

Use of the no-write allocate policy causes delays when data from storage is touched first by a store and subsequently by a load during the period when the store is draining to the next level of cache after being completed. In a design where a lowest level of cache such as the L1 is implemented with the no-write allocate policy, in cases where the store does not write to the no-write allocated cache (e.g. no allocate in the L1) the load must wait for the store to drain to the next level of cache (e.g. the L2 cache) before it can retrieve the data for further processing. This can result in a significant delay in processing for programs that frequently hit such a window (e.g., such as due to the relative spacing of loads after stores precluding direct forwarding prior to the store completing). The delay may be exacerbated during the store drain process due to mechanisms such as store gathering, which must be shut down in order to complete the drain of the store once a load is detected that matches the address of the store being kept for gathering.

The present invention provides an advantage over the prior art of reducing and/or minimizing the delay to loads, which might normally execute during the time when an older store may be draining.

The following description uses the L1 with the no-write allocate policy and the L2 with the write allocated policy to describe the present invention. Prior methods for addressing the problem just discussed include adding store forwarding to the Store queue/gathering structure. However, such mechanisms are costly and include various negative impacts to the design. Alternative cache design polities perform level 1 cache allocation on store misses. However, these policies are not best suited for many workload types such as those where processed results are never referenced by the thread writing results.

Thus, the present invention enhances the core store queue to hold on to stores that missed the cache and were drained to the L2 to extend the window in which loads may forward from the stores indefinitely (subject to pressure for store queue resources). The present invention allows for store queue entries to be consumed by younger stores executing in the core on demand, thus invalidating the drained stores as space is needed in the store queue. This provides extended store forwarding capability without adding expensive store forwarding queues to the L2, instead utilizing existing store queue resources that already support forwarding of stores waiting to be drained.

The present invention extends existing store forwarding functionality, such as for a store forwarding design that allows for the forwarding from an older store (youngest older store) to a load instruction by accessing a store data queue, muxing out the relevant data and providing store data to the load during its execution.

Figure 3:
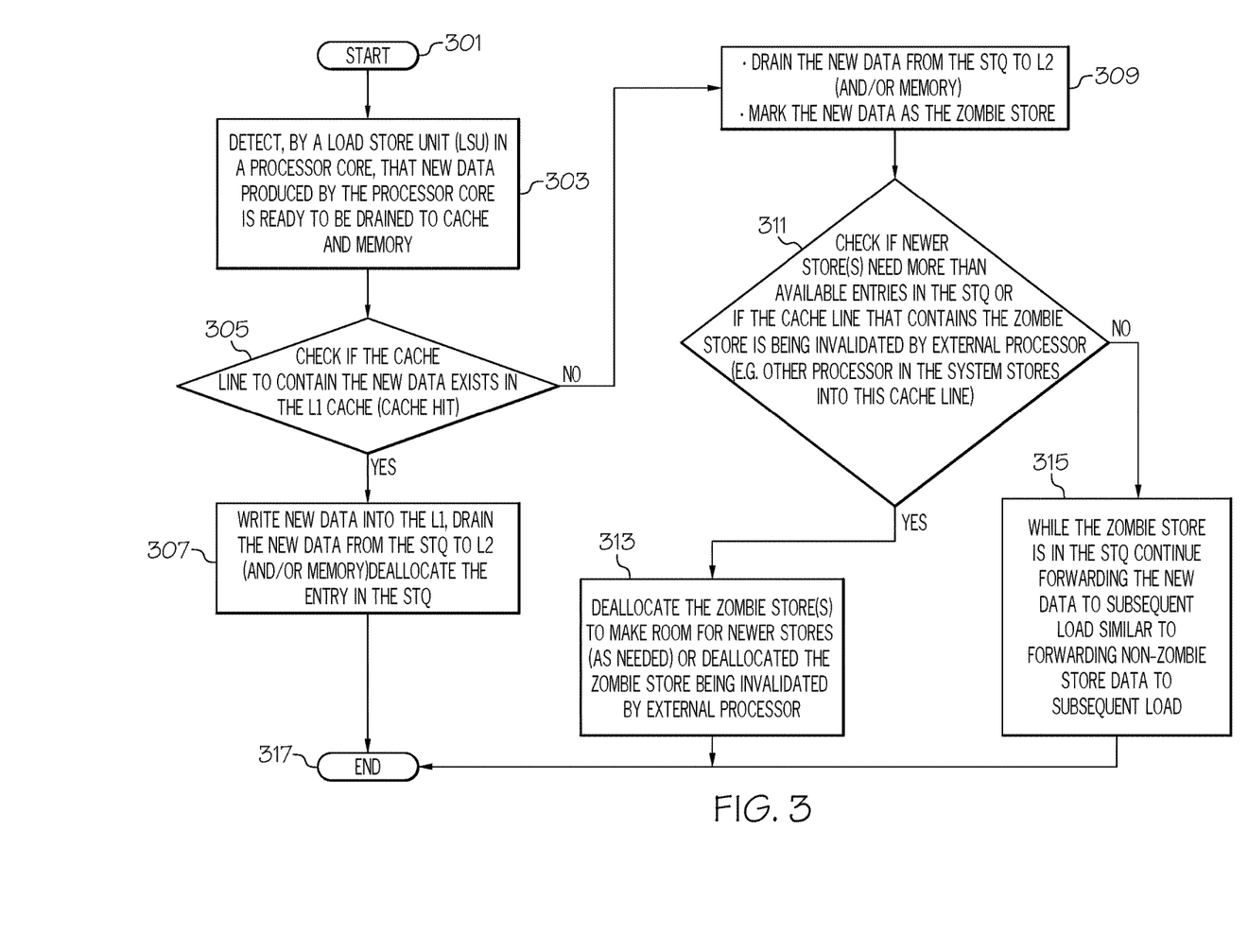
FIG. 3 is a high-level flow chart of exemplary steps taken by hardware devices to extend store forwarding for store misses without cache allocates.

With reference now to FIG. 3, a high-level flow chart of exemplary steps taken by hardware devices to extend store forwarding for store misses without cache allocates is presented.

After initiator block 301, a load store unit (LSU) in a processor core detects that new data produced by the processor core is ready to be drained to an L2 cache in the processor core, as described in block 303. For example consider LSU 498 shown in FIG. 4 (analogous to the LSU 298 shown in FIG. 2), which detects that an execution unit 405 (e.g., FXU 205 shown in FIG. 2) in the processor core is ready to drain data to the L2 cache 416 (analogous to the L2 cache 216 shown in FIG. 2).

Figure 4:
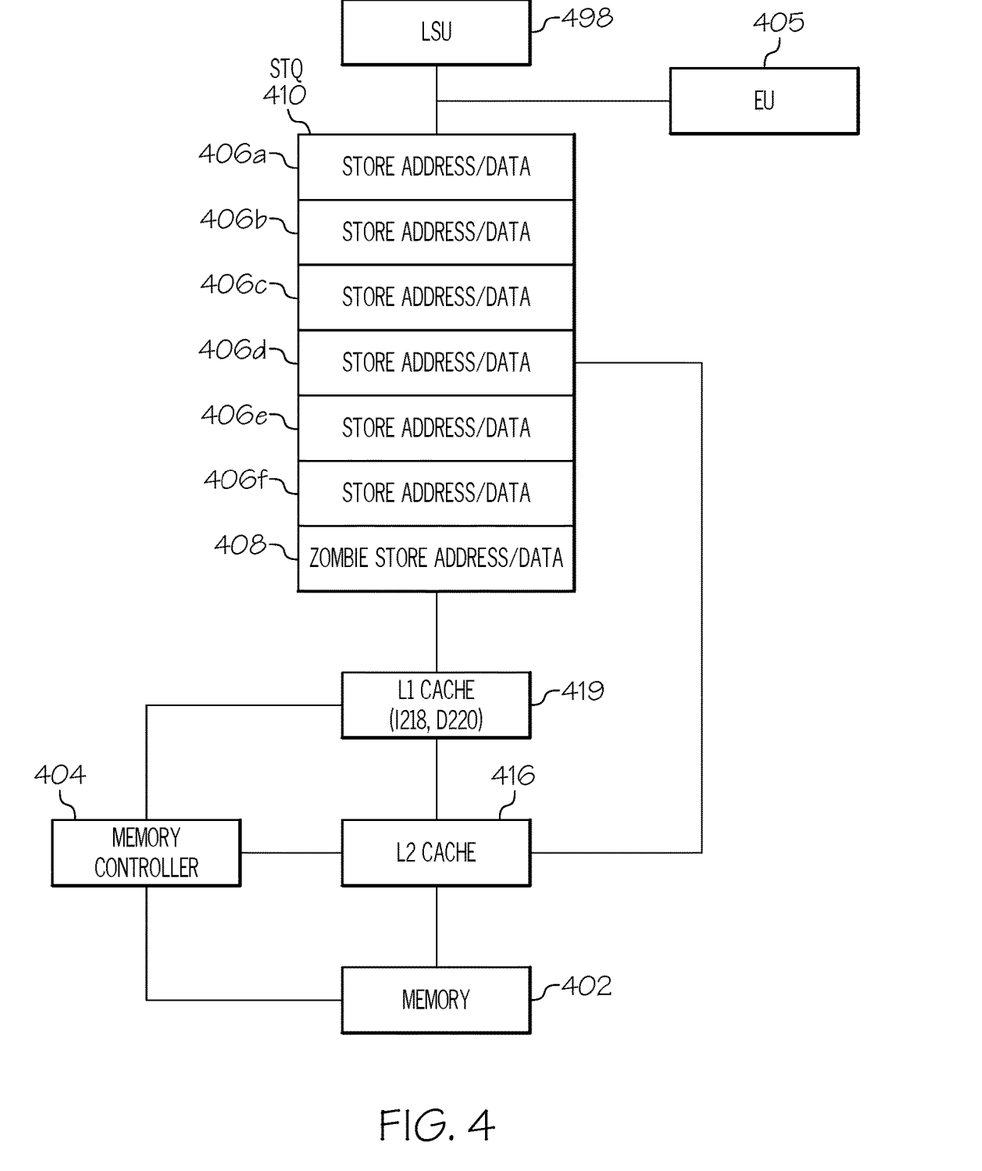
FIG. 4 depicts a simplified version of the processor core shown in FIG. 2 that incorporates novel features of the present invention.

As described in block 305, the LSU then checks to determine whether or not an earlier version of the new data is stored in an L1 cache in the processor core (e.g., L1 cache 419 shown in FIG. 4, which is analogous to the L1 Instruction-cache 218 and/or the L2 Data-cache 220 shown in FIG. 2).

As described in block 307 of FIG. 3, in response to the LSU detecting that the earlier version of the new data is already stored in the L1 cache, the LSU writes the new data to the L1 cache, drains the new store data to the L2, and deallocates the corresponding entry in the Store Queue (STQ) (e.g., STQ 410 shown in FIG. 4, which is analogous to the STQ 210 shown in FIG. 2). Since the new data is written into the L1 cache, it is available to subsequent load(s) from the L1 cache and the store does not need to stay in the STQ.

As described in block 307 of FIG. 3, in response to the LSU detecting that the earlier version of the new data is not stored in the L1 cache, a memory controller 404 (see FIG. 4) directs the STQ 410 to send the new data as L1 cache missed data to the L2 cache 416. As shown in FIG. 4, STQ 410 is able to store routine data waiting to be drained to the L2 cache and written to the L1 cache in store address/data 406a-406f, which are available for future use by the processor core. However, in further accordance with the present invention, the STQ (e.g., STQ 410) makes data available for future use by the processor core from store that does not have the cache line allocated in the L1 cache.

As described in block 309 of FIG. 3, in response to the cache line being stored not being allocated in the L1 cache, the memory controller directs the STQ 410 to drain the store to the L2 cache 416, and to mark the store as a zombie store with a zombie stat bit. This zombie stat bit indicates that the new data is a zombie store entry (e.g., zombie store address/data 408 shown in FIG. 4) that is not in the L1 cache but is available to be used by the processor core via the STQ.

As described in block 311 of FIG. 3, the STQ checks if new entry(s) are needed for newer stores being executed by the LSU. The STQ also checks if the zombie store(s) is being invalidated by the L2 (e.g., the cache line that contains the zombie store is being requested by another processor in the system).

As described in block 313 of FIG. 3, if the STQ does not have enough entry(s) to accept new store(s) from the LSU, then the memory controller directs the STQ to deallocate enough number of zombie stores to make room for new store(s) being executed by the LSU. If there is an invalidating request from the L2 for the line that contain the zombie store(s), then the memory controller directs the STQ to deallocate the corresponding zombie store(s). Deallocated zombie store(s) are not available to forward data to subsequent load.

As described in block 315 of FIG. 3, zombie store(s) that are not deallocated in the STQ are allowed to forward data to subsequent load(s), similar to the way in which non-zombie store(s) are allowed to forward data to subsequent load(s).

The flow chart shown in FIG. 3 terminates at terminator block 317.

In an embodiment of the present invention, the memory controller writes the new data to system memory (e.g., memory 402 shown in FIG. 4) while maintaining the new data in the STQ past completion of writing the new data to system memory. That is, even though the data is written through to system memory under the no-write allocate policy, a zombie copy of the data is nonetheless maintained in the STQ 410, thus affording an extended store forwarding for store misses without cache allocate.

In an embodiment of the present invention, in response to the LSU detecting that the earlier version of the new data is stored in the L1 cache, the memory controller writes the new data to the L1 cache.

In one or more embodiments of the present invention, the zombie store entry does not have a valid tag suitable for comparison to an internal core request by the processor core. This internal core request may be for a pipeline flush of registers in the processor core, for a completion of an execution performed by one or more execution unites within the processor core, etc.

In an embodiment of the present invention, the memory controller determines that the STQ has no current vacancies and that a younger store is attempting to create a new STQ entry in the STQ. In response to the memory controller determining that the STQ has no current vacancies and that the younger store is attempting to create the new STQ entry in the STQ, the memory controller deems the zombie store entry to be invalid and replaces the zombie store entry with the new STQ entry in the STQ.

In an embodiment of the present invention, the memory controller invalidates the zombie store entry in response to a new zombie store entry being stored in the STQ, where the new zombie store entry has a same memory address as the zombie store entry that was previously stored in the STQ, and where invalidating the zombie store entry frees space in the STQ for another cache line.

In an embodiment of the present invention, the memory controller invalidates the zombie store entry in response to data being loaded into an execution unit within the processor core partially overlapping data in the zombie store entry, where invalidating the zombie store entry frees space in the STQ for another cache line. In response to the data being loaded into the execution unit within the processor core partially overlapping data in the zombie store entry, the memory controller sends an L1 cache miss request to the L2 cache. For example, if EU 405 shown in FIG. 4 is using a thread of data (or instructions) that include some, but not all of the thread found in the zombie store address/data 408, then the zombie store address/data 408 is invalidated and overwritten.

In an embodiment of the present invention, the memory controller invalidates the zombie store entry in response to a reload of the new data into the L1 cache, where invalidating the zombie store entry frees space in the STQ for another cache line. That is, if new data that updates the data found in the zombie store address/data 408 is loaded into L1 cache 419, then zombie store address/data 408 is invalidated and overwritten.

In an embodiment of the present invention, the memory controller invalidates the zombie store entry in response to the L2 cache requesting data from the L1 cache, where invalidating the zombie store entry frees space in the STQ for another cache line. That is, if the L2 cache requests that the L1 cache return the same data as found in the zombie store address/data 408, then zombie store address/data 408 is invalidated and overwritten.

Note that the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a Hardware Description Language such as VHDL (VHSIC Hardware Description Language) program and a custom chip. Other type of Hardware Description Language can be used. Furthermore different type implementation including non-custom design implementation such as Field Programmable Gate Arrays (FPGAs), Application Specific Integrated Circuits (ASICs), and other similar electronic devices. Thus, any software-implemented method described herein may be emulated by a hardware-based language program, which is then applied to a non-custom chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method comprising:
   detecting, by a load store unit (LSU) in a processor core, that new data produced by the processor core is ready to be drained to an L2 cache in the processor core;
   checking, by the LSU, whether an earlier version of the new data is stored in an L1 cache in the processor core;

in response to the LSU detecting that the earlier version of the new data is not stored in the L1 cache, sending, by a memory controller, the new data as L1 cache missed data to a store queue (STQ), wherein the STQ makes data available for deallocation from the STQ to the L2 cache;

determining, by the memory controller, whether a newer data produced by the processor core is waiting to be stored in the STQ; and in response to the memory controller determining that there is no newer data waiting to be stored in the STQ, maintaining, by the memory controller, the new data in the STQ with a zombie stat bit, wherein the zombie stat bit indicates that the new data is a zombie store entry that can be utilized by the processor core.

2. The method of claim 1, further comprising:
writing, by the memory controller, the new data to system memory; and
maintaining, by the memory controller, the new data in the STQ past completion of writing the new data to system memory.

3. The method of claim 1, further comprising:
in response to the LSU detecting that the earlier version of the new data is stored in the L1 cache, writing the new data to the L1 cache.

4. The method of claim 1, wherein the zombie store entry does not have a valid tag suitable for comparison to an internal core request by the processor core.

5. The method of claim 4, wherein the internal core request is for a pipeline flush of registers in the processor core.

6. The method of claim 4, wherein the internal core request is for a completion of an execution performed by one or more execution unites within the processor core.

7. The method of claim 1, further comprising:
determining, by the memory controller, that the STQ has no current vacancies;
determining, by the memory controller, that a younger store is attempting to create a new STQ entry in the STQ; and
in response to the memory controller determining that the STQ has no current vacancies and that the younger store is attempting to create the new STQ entry in the STQ, deeming the zombie store entry invalid and replacing, by the memory controller, the zombie store entry with the new STQ entry in the STQ.

8. The method of claim 1, further comprising:
invalidating, by the memory controller, the zombie store entry in response to a new zombie store entry being stored in the STQ, wherein the new zombie store entry has a same memory address as the zombie store entry that was previously stored in the STQ, and wherein invalidating the zombie store entry frees space in the STQ for another cache line.

9. The method of claim 1, further comprising:
invalidating, by the memory controller, the zombie store entry in response to data being loaded into an execution unit within the processor core partially overlapping data in the zombie store entry, wherein invalidating the zombie store entry frees space in the STQ for another cache line; and
in response to the data being loaded into the execution unit within the processor core partially overlapping data in the zombie store entry, sending, by the memory controller, an L1 cache miss request to the L2 cache.

10. The method of claim 1, further comprising:
invalidating, by the memory controller, the zombie store entry in response to a reload of the new data into the L1 cache, and wherein invalidating the zombie store entry frees space in the STQ for another cache line.

11. The method of claim 1, further comprising:
invalidating, by the memory controller, the zombie store entry in response to the L2 cache requesting data from the L1 cache, wherein invalidating the zombie store entry frees space in the STQ for another cache line.

12. A computer program product comprising one or more non-transitory computer readable storage mediums, and program instructions loaded on at least one of the one or more non-transitory computer readable storage mediums, the loaded program instructions comprising:
program instructions to detect, by a load store unit (LSU) in a processor core, that new data produced by the processor core is ready to be drained to an L2 cache in the processor core;
program instructions to check, by the LSU, whether an earlier version of the new data is stored in an L1 cache in the processor core;
program instructions to, in response to the LSU detecting that the earlier version of the new data is not stored in the L1 cache, send, by a memory controller, the new data as L1 cache missed data to a store queue (STQ), wherein the STQ makes data available for deallocation from the STQ to the L2 cache;
program instructions to determine, by the memory controller, whether a newer data produced by the processor core is waiting to be stored in the STQ; and
program instructions to in response to the memory controller determining that there is no newer data waiting to be stored in the STQ, maintain, by the memory controller, the new data in the STQ with a zombie stat bit, wherein the zombie stat bit indicates that the new data is a zombie store entry that can be utilized by the processor core.

13. The computer program product of claim 12, wherein the method further comprises:
program instructions to write, by the memory controller, the new data to system memory; and
program instructions to maintain, by the memory controller, the new data in the STQ past completion of writing the new data to system memory.

14. The computer program product of claim 12, wherein the method further comprises:
program instructions to in response to the LSU detecting that the earlier version of the new data is stored in the L1 cache, write the new data to the L1 cache.

15. The computer program product of claim 12, wherein the zombie store entry does not have a valid tag suitable for comparison to an internal core request by the processor core.

16. The computer program product of claim 12, wherein the method further comprises:
program instructions to determine, by the memory controller, that the STQ has no current vacancies;
program instructions to determine, by the memory controller, that a younger store is attempting to create a new STQ entry in the STQ; and
program instructions to, in response to the memory controller determining that the STQ has no current vacancies and that the younger store is attempting to create the new STQ entry in the STQ, deem the zombie store entry invalid and to replace, by the memory controller, the zombie store entry with the new STQ entry in the STQ.

17. The computer program product of claim 12, wherein the method further comprises:

program instructions to invalidate, by the memory controller, the zombie store entry in response to a new zombie store entry being stored in the STQ, wherein the new zombie store entry has a same memory address as the zombie store entry that was previously stored in the STQ, and wherein invalidating the zombie store entry frees space in the STQ for another cache line.

18. The computer program product of claim 12, wherein the method further comprises:

program instructions to invalidate, by the memory controller, the zombie store entry in response to data being loaded into an execution unit within the processor core partially overlapping data in the zombie store entry, wherein invalidating the zombie store entry frees space in the STQ for another cache line; and program instructions to, in response to the data being loaded into the execution unit within the processor core partially overlapping data in the zombie store entry, send, by the memory controller, an L1 cache miss request to the L2 cache.

19. The computer program product of claim 12, wherein the method further comprises:

program instructions to invalidate, by the memory controller, the zombie store entry in response to a reload of the new data into the L1 cache, and wherein invalidating the zombie store entry frees space in the STQ for another cache line.

20. A processor core comprising:
one or more hardware execution units;
a load store unit (LSU);
an L1 cache;
an L2 cache;
a memory controller; and
a store queue (STQ);
wherein the LSU detects that new data produced by the processor core is ready to be drained to the L2 cache in the processor core;
wherein the LSU checks whether an earlier version of the new data is stored in the L1 cache;
wherein the memory controller, in response to the LSU detecting that the earlier version of the new data is not stored in the L1 cache, sends the new data as L1 cache missed data to the store queue (STQ), wherein the STQ makes data available for deallocation from the STQ to the L2 cache;
wherein the memory controller determines whether a newer data produced by the processor core is waiting to be stored in the STQ; and
wherein the memory controller, in response to the memory controller determining that there is no newer data waiting to be stored in the STQ, maintains the new data in the STQ with a zombie stat bit, wherein the zombie stat bit indicates that the new data is a zombie store entry that can be utilized by the processor core.

* * * * *